United States Patent Office 3,369,767
Patented Feb. 20, 1968

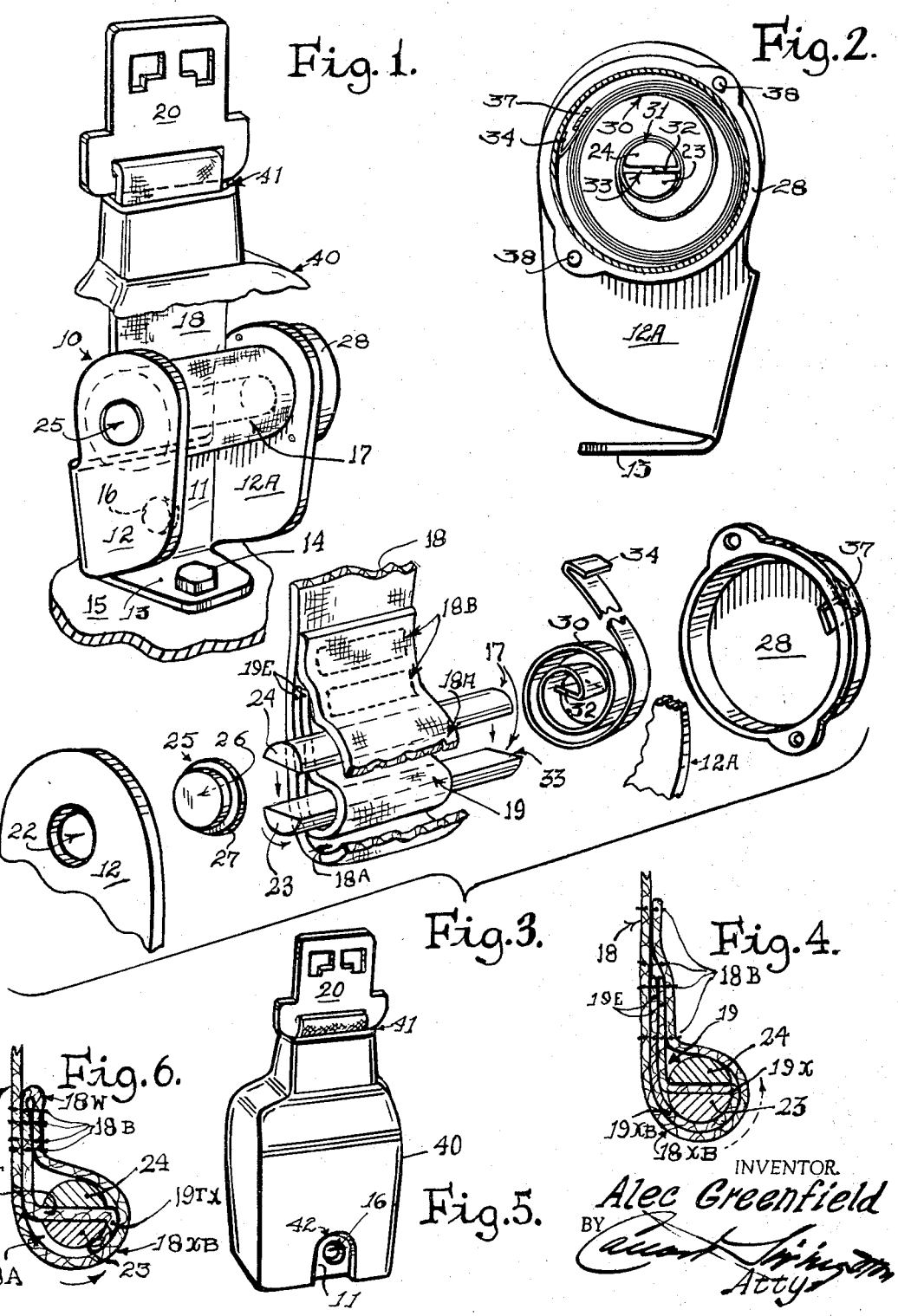

3,369,767
SEAT BELT RETRACTOR
Alec Greenfield, Chicago, Ill., assignor to The Greenfield Company, Elk Grove Village, Ill., a corporation of Illinois
Filed Sept. 27, 1965, Ser. No. 490,531
14 Claims. (Cl. 242—107)

ABSTRACT OF THE DISCLOSURE

A composite spindle shaft is formed by a pair of mating semi-cylindrical bars each having a flat face juxtaposed with the flat face of the other to clamp a belt-web member therebetween, the ends of the shaft being supported for rotation by journal means preventing separation of the pair of bars and the belt-web having further looped portions embracing the shaft. Supplemental to the subject: first, a spiral driving spring has convolutions encircling one end of the shaft to prevent separation of the pair of bars while applying torque thereto; second, an end of the spring is caught between the pair of bars for coupling thereto.

---

The invention relates to automobile safety belts and the like and has as its principal object the provision of a simple spring retractor assembly for reeling in the belt webs when not in use.

One of the features of the novel retractor assembly is the provision of an economically manufactured shaft or spindle means adapted to engage and capture the end of the belt to secure it to the spring reel while affording an optimum pull-out torque against the reeling spring.

Another feature relates to the provision of a simple mounting cleat and trunnion means for attachment to the floor or a wall of a car body, together with a barnacle housing attached to the cleat to secure the split-belt-reeling shaft in operative engagement with a reeling spring.

Additional features and aspects of novelty and utility relate to details of the construction and operation of the embodiment described and claimed hereinafter in view of the annexed drawing in which:

FIGURE 1 is a perspective view of the retractor and boot with portions of the boot cut away;

FIGURE 2 is a side elevation of the retractor with portions of the spring housing cap shown in section;

FIGURE 3 is an exploded perspective of the reeling shaft assembly with parts shown fragmentally;

FIGURE 4 is a sectional detail of the split shaft as enclosed by the belt web;

FIGURE 5 is a perspective to reduced scale of the retractor enclosed in a boot;

FIGURE 6 is a cross-sectional detail similar to FIGURE 4 but showing a modified form of belt anchoring in the split shaft.

The retractor, as viewed in FIGURE 1, comprises a trunnion cleat 10 in the form of a metal stamping of channel-like configuration consisting of a main wall or web 11 having opposite sides struck up to provide parallel trunnion flanges 12 and 12A, there being a mounting foot 13 struck up from the intervening edge of the wall and pierced to receive a mounting bolt 14 engaging in the car floor 15. Another hole 16 is provided in the main wall for mounting the cleat to some other part of the car body adjacent the seat to be served by the appertaining belt section.

It is to be understood that the usual atuomobile seat belt consists of two half-sections, one having the buckle (not shown) attached thereto and the other having the latching or shackle tongue 20 attached thereto.

Usually the buckle section is located at the middle of the seat and no retractor is furnished therefor, since this section of the belt will not be in the way of the passenger entering and moving onto the seat. But the shackle tongue sections, which are usually at the door side of the vehicle, tend to obstruct easy seating or departure and the function of the retractors therefore is to reel-in the obstructing sections of the belt nearest the door.

Accordingly, retractors will usually be supplied only for the belt sections nearest the door, the actual mounting of the retractor units, whether on the floor or seat well or frame, depending in each case upon the design of the particular make of automobile involved.

Continuing with the view of FIGURE 1, the retractor includes a spring-driven reeling shaft or spindle means generally indicated at 17 and journalled between the aforesaid pair of trunnion flanges 12, 12A.

Spring means, acting with considerable torque on the spindle, is enclosed in a barnacle cap or shell 28 secured to the outside face of the flange opposite one end of the spindle means, while the other end of the spindle assembly 17 is enclosed in a combination cap and insert bearing 25 seating in opening 22 on trunnion 12, FIGURE 3.

The spindle assembly as seen in FIGURE 3 comprises two mating semi-cylindrical lengths 23, 24 of metal rod spanning the distance between the trunnion flanges. The main belt web 18 is provided at its fixed reeling end with a loop 18A closed by stitching 18B, the loop snugly encircling both of the semi-cylindrical split-shaft members, as well as a secondary loop 19 of webbing, which will be preferably thinner than the main belt stock, however, the free ends 19E of this secondary loop also being caught by the stitching 18B.

Referring to the enlarged sectional detail of FIGURE 4, a portion 19X of the secondary loop passes in between the juxtaposed flat faces of the split shaft sections 23, 24 so as to encircle only one of the same in completing its looping configuration.

In addition to the stitched joiner of the two webbing loops 18A, 19, a combination clamping and binding action is directly exerted upon the part 19X of the internal loop sandwiched in between the two shaft rods, the binding action being exerted particularly on the return bend or bight 19XB of this loop because it is caught between the outside of one of the half-round rods 23 and the inside of the main belt web loop at 18XB.

As a consequence of the foregoing dual-looped engagement of the anchored end of the belt to the reel, the reeling torque is applied to the belt instantly, without the necessity of taking up slack, yet the belt is not fixedly attached to the spindle means and can be as readily disengaged therefrom as it is engaged therewith in assembly of the device. In addition, the described engagement of the belt with the spindle affords a degree of strength which far exceeds the maximum load requirements and safety margin prescribed for such belts.

A modified form of belt to spindle attachment is shown in FIGURE 6 wherein the main web of the belt 18 also has the attaching loop 18A formed therein and secured by stitching 18B; but instead of the secondary loop of FIGURE 4 the free end of the belt is turned back at 18W upon itself to provide a tongue 19T which is caught by said stitching and passed in between the flat faces of the half-spindles and has its free end portion 19TX turned a distance around the curved side of one of the half-round rods 23 so as to be bound against said curved side by the inner side of the belt loop analogously to the binding action at 18XB, FIGURE 4. Such a construction permits the analogous torque action in reeling and does not require the handling of separate secondary loops as in the case of the FIGURE 4 construction.

Means for confining the mating half-sections of the spindle in assembled relation at one end comprises the cup-shaped bearing and cap 25, the well portion 26 of which fits into a bore 22 in trunnion 12, the ends of the two half-round sections, spaced by the webbing, fitting rotatably in the well 26, the flange 27 of which seats against the inside trunnion face.

The opposite end of the spindle assembly projects through and beyond the opposite trunnion arm 12A (omitted for clarity from FIGURE 3, but see FIGURE 2) to be encircled closely by several tight turns 31 of the winding spring 30, the innermost end of which is diametrically offset as at 32 in position to fit in between the appertaining two spindle pieces as at 33, as a result of which the said pieces at this end are likewise held in assembled condition and the spring is coupled with the spindle.

Fitting over the reeling spring is a cup-shaped springhousing 28 (FIGURES 1 to 3) having a lug 37 struck inwardly to engage the hooked end 34 of the reeling spring.

The assembly of the retractor is completed in one method by rotating the spring housing to tension the reeling spring appropriately and then setting the housing home permanently by means of rivets 38.

The belt-retracting action of the reeling mechanism is illustrated in FIGURE 4 wherein the arrow indicates counterclockwise torque exerted by the spring which will pull on the belt even though the web has been pulled fully out to the loop, since the tongue portions 19X and 19XB remain caught and tied to the spindle means so that substantially full torque is exerted at once even if the intermediate tongue portion happens to be pulled into a vertical line (instead of the horizontal position seen in FIGURE 4) with an extreme unwinding of the belt.

The construction of FIGURE 4 couples the belt to the split-spindle means most effectively and a binding effort is transmitted to all portions of the webbing almost instantly even when the belt is pulled out to its limit. After the first full rotation of the spindle from a complete pull-out, the radial thickness of the webbing builds up rapidly for rapid retraction. The anchorage of the belt is to two spindle pieces 23, 24 when the belt is fully extended.

The retractor is preferably provided with an enclosing boot 40 of molded synthetic material (FIGURE 5) having a narrow web passage 41 at its upper end and against the rim of which the shackle tongue 20 stops when the web is fully reeled in.

Near the bottom of one wall of the boot is an open-ended slot 42 to pass the attaching bolt in those installations in which the side-mounting hole 16 is employed.

If the boot is not used, the shackle tongue is nevertheless made wide enough to stop against the retractor frame when the belt is fully reeled in.

It will be seen that an exceptionally strong but simple and inexpensive spindle and spring assembly has been achieved, which provides a simple multiple self-binding means for anchoring the belt to the reeling spindle and affording a good pull-out torque against the reeling spring to the limit of withdrawal, it being necessary that the spring exert a very strong pull in order to drag the belt over the seat and reel it in fully; and the attachment of the belt to the spindle employs the split spindle members themselves as a principal part of the coupling means in a way to distribute the load to both spindle sections 23, 24.

I claim:

1. In a seat belt retractor, the combination with a windable belt web of a bracket including opposite trunnion arms; a split-spindle assembly carried by said bracket and comprising two half-round spindle pieces, fitted in alignment against opposite sides of a portion of the belt webbing to seize the latter therebetween, said webbing having a thickness calculated when positioned in between the spindle pieces as aforesaid to permit the latter to present a substantially circular cross section at its opposite ends, said webbing being of a width at the spindle site less than the length of the spindle to leave said opposite ends free of webbing for rotative support, each of said opposite end portions having journal support at one of said trunnion arms wherein said portion of belt webbing between the spindle pieces comprises a short tongue secured between two other portions of the webbing, and said other webbing portions define a closed loop passing around the outer peripheral parts of the spindle assembly formed by said pieces.

2. In a seat belt retractor, a reeling mechanism comprising, in combination with a length of belt webbing, a split-spindle assembly formed of two half-round bars in confronting assembly to form a cylinder and each having a flat inner side and a semi-cylindrical outer side, said webbing length at one said end thereof having a closed loop which encircles said spindle assembly, and having fast therewith and within said loop, a tongue portion seized between the confronting flat sides of the bars in assembly as aforesaid; and means rotatively supporting said spindle assembly at its opposite ends and confining the bars in assembled relation as aforesaid.

3. The construction of claim 2 wherein said loop is formed by turning back and securing the said end portion of the webbing upon itself, and said tongue comprises a short strip secured between the turned-back webbing portions, said loop passing closely about the assembled spindle bars as aforesaid, and said tongue having a free end portion projecting between the bars for seizure thereby as aforesaid.

4. The construction of claim 3 further characterized in that the projecting free end portion of the tongue is extended laterally beyond the bars and turned back a distance over the cylindrical surface of one of the bars for seizure between the latter surface and an inside surface portion of said loop.

5. The construction of claim 2 wherein said means providing bearing support includes a pair of spaced arms each having a spindle hole aligned with the spindle hole of the other, one end of the spindle assembly being fitted into a cup-shaped insert received in the spindle hole in said arm, and the other end of the spindle assembly projecting through and beyond the hole in the remaining one of said arms; a convoluate spiral spring having an inner end turned, diametrically to fit in between the flat faces of the appertaining projecting end portion of the spindle assembly for driving coupling therewith, said spring being tensioned and having an outer end portion held fast whereby to exert a winding torque on the spindle.

6. The construction of claim 5 further characterized in that said spring has at least one inner turn adjoining said diametrically turned end which inner turn is of a diameter to fit closely about the appertaining end of the spindle assembly whereby to further confine the bars thereas in confronting assembly.

7. In a seat belt retractor, a flexible belt web having an end portion turned back and secured to itself to form a loop, a short flexible tongue having one portion fast with the belt web and a free end portion extending inside said loop, a pair of mating semi-cylindrical spindle bars each having a flat diametric face and a round outer face, said bars passing through said loop in assembly with their flat faces in confrontation and each fitting against one of the sides of said tongue so that the latter is seized therebetween, said tongue having a predetermined thickness such that in combination with the assembled bars as aforesaid said bars form a spindle, with substantially round opposite ends and bracket means rotatively supporting said opposite ends of the assembled bars.

8. The construction of claim 7 wherein said free end portion of the tongue passes substantially beyond the margins of the flat bar faces and turns a distance onto the cylindrical portion of one of said bars for seizure between the latter and an inside surface portion of said loop responsive to a pull on the belt web.

9. The construction of claim 7 wherein the opposite end portions of said spindle assembly are respectively fitted into circumambiently extending members respectively disposed at said opposite ends and serving to prevent said bars from separating from assembled condition while permitting rotative movement thereof.

10. The construction of claim 9 further characterized in that a first one of said circumambiently extending members is a cup-shaped bearing cap into which the two semi-cylindrical end portions of juxtaposed ends of said bars which define the corresponding end of the spindle assembly are rotatively received and thereby prevented from separating in a radial or diametric sense.

11. The construction of claim 9 further characterized in that a second one of said circumambiently extending members is a convolute spring drivingly coupled to the appertaining end of the spindle assembly opposite from said first member and having at least one of its convolutions turning closely about the periphery of the spindle assembly.

12. In a reeling device, a spindle and means providing a rotative support for said spindle, a belt adapted to be wound on the spindle, said belt having a closed loop formed at an end thereof, a tongue fixed to the belt and having a free end projecting in an approximately diametric sense across said loop, said spindle passing through said loop and having an axially-extending separation between opposite sides thereof of an axial length sufficient to admit said tongue, said free end of the tongue being lodged in said axially extending separation and serving to couple the loop to the spindle in rotation thereof whereby the belt can be wound onto the spindle responsive to such rotation.

13. Web reeling mechanism comprising a reel structure including a split spindle consisting of two mating semi-cylindrical rods and means supporting the same near their ends for rotation together; and a web to be wound on said spindle and having an end portion formed in a closed main loop; a secondary web loop secured within the main loop and passing between said rods and around one of the same whereby one portion of the secondary loop is clamped between the rods and another portion thereof is bount between an inside surface of the main loop and the curved outer surface of one of said rods; said loops fitting closely about the two rods in assembled relation as aforesaid.

14. In combination, a belt member to be wound upon a reel, and reeling means including an elongated spindle of cylindrical configuration and providing a long median slot along its length; means engaging said spindle near its ends for rotatively supporting the same; said belt member having an end portion with a closed loop formed thereat and of a size to fit around said spindle; and means within said loop providing a length of flexible material secured to the belt and extending in the direction of the length of the portions of the belt forming said loop and passing through said spindle slot and at least partially around the cylindrical periphery of the spindle so as to be bound between the latter and the inside surface of a portion of said loop when the belt is wound upon said spindle.

References Cited
UNITED STATES PATENTS

| | | | |
|---|---|---|---|
| 761,751 | 6/1904 | Barrett | 242—74.1 X |
| 1,663,836 | 3/1928 | Hall. | |
| 1,995,026 | 3/1935 | Gast | 242—74 X |
| 3,251,627 | 5/1966 | Fisher | 242—107 X |

WILLIAM S. BURDEN, *Primary Examiner.*